No. 644,167. Patented Feb. 27, 1900.
C. E. FRINK & M. MURPHY.
AMMONIA PIPE COUPLING.
(Application filed Oct. 14, 1899.)
(No Model.)
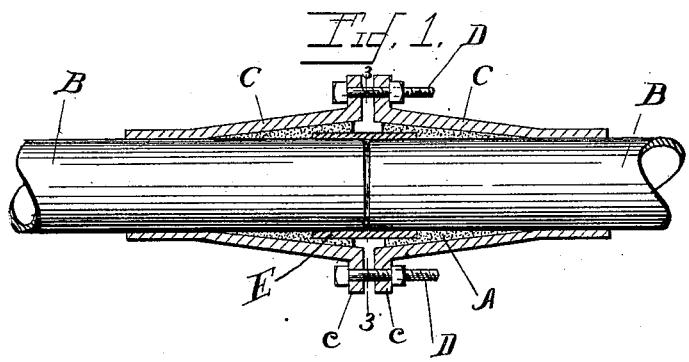
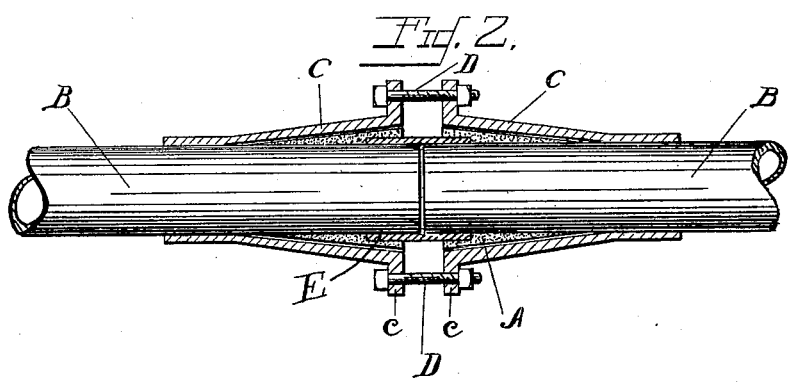
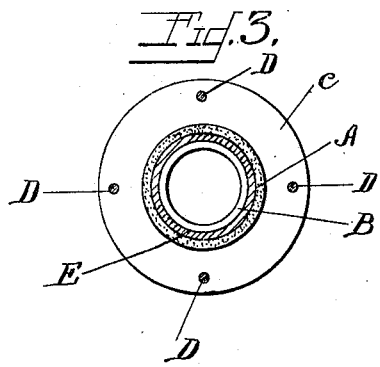
Witnesses
Ira D. Perry
J B Weir
Inventors
Charles E. Frink
Morris Murphy,
by A. Miller Belfield Atty.

UNITED STATES PATENT OFFICE.

CHARLES E. FRINK AND MORRIS MURPHY, OF CHICAGO, ILLINOIS.

AMMONIA-PIPE COUPLING.

SPECIFICATION forming part of Letters Patent No. 644,167, dated February 27, 1900.

Application filed October 14, 1899. Serial No. 733,580. (No model.)

*To all whom it may concern:*

Be it known that we, CHARLES E. FRINK and MORRIS MURPHY, citizens of the United States, residing at Chicago, in the county of Cook and State of Illinois, have invented certain new and useful Improvements in Ammonia-Pipe Couplings, of which the following is a specification.

Our invention relates to a joint or coupling adapted for use in joining or connecting the ends of pipes containing ammonia or other thin gas.

The object of our invention is to provide a simple, practical, and cheap joint or coupling which shall be especially effective in preventing the escape of the ammonia or light gas from the pipes.

To the attainment of the foregoing and other desired ends our invention consists in matters hereinafter set forth.

In the accompanying drawings, Figure 1 is a view, partly in section and partly in side elevation, of portions of a couple of pipes and a joint or coupling connecting the same and embodying our invention, the joint being in condition for use. Fig. 2 is a similar view showing the joint arrangement upon the ends of the pipes, but not drawn up into condition for use. Fig. 3 is a vertical section taken on line 3 3 in Fig. 1.

In the embodiment of our invention which we have shown in the drawings a sleeve A, made of soft metal, preferably lead, is arranged over the meeting ends of the pipes B B.
The opposite end portions of the sleeve A are oppositely inclined or beveled, so as to give the sleeve a general double-cone-shaped form. Outside of the soft-metal sleeve A are arranged a couple of collars C C, whose adjacent portions are inclined or beveled in substantial correspondence with the inclination of the end portions of the sleeve A. The inner ends of the collars C C are provided with flanges *c c*, through which bolts D D are extended.

As a preferred arrangement and also as a matter of further and specific improvement a sleeve or collar E, made of iron or similar material, is arranged immediately about the pipe ends and the soft-metal sleeve split into two longitudinal portions and abutted against and over the ends of this collar E. In this way pressure can be brought directly to check the outflow of the gas, for this will tend to flow out the ends of the collar E, where great pressure can be brought. In case the collar E were omitted it is obvious that pressure cannot be brought immediately upon the ends of the pipes, for the clamping-collars are slightly separated at that point.

In preparing the joint the collar E and the portion of the soft-metal sleeve A are arranged over the pipe ends, and the collars C C are placed loosely in position over the sleeve A and the bolts D D extending through the flanges thereof, as shown in Fig. 2. The nuts of the bolts D D are then tightened by a wrench, so as to draw the collars C C closely together, as shown in Fig. 1. In drawing the collars C C together the portions of the soft-metal sleeve are firmly and tightly compressed against the end portion of the collar E and also against the pipes and the interiors of the clamping-collars, so as to make a tight and permanent joint, which acts to absolutely prevent the escape of ammonia or other gas from within the pipes. It will be seen that this joint is cheap and practical and involves but very few parts, which can be easily and cheaply constructed; also, that it can be quickly and easily put together and taken apart, and, further, that it avoids the necessity of having to cut threads either upon the pipes or collars surrounding them.

What we claim as our invention is—

1. In a pipe-coupling, the combination of a metal collar adapted to fit over and cover the meeting line of the pipes and to extend on both sides of such line; a transversely-divided soft-metal sleeve, each of whose two portions or sections fits over and incloses one of the opposite end portions of the collar and the adjacent portions of the pipe, the outer surfaces of said portions or sections being tapered away from the meeting line of the pipes; a couple of collars adapted to fit over the portions or sections of the soft-metal sleeve, and made with their interiors internally tapered in substantial correspondence with such portions or sections, said collars being extended toward one another so that their flaring ends substantially meet, and the two portions or sections of the soft-metal sleeve practically filling and being substantially all confined within said collars, and bolts for drawing such collars toward one another, each of said bolts being extended between and engaging flanges formed on said collars, whereby the adjustment of one set of bolts tightens both collars.

2. In a pipe-coupling, the combination of a soft-metal tubular structure adapted to fit over and inclose the ends of the pipes, and made with its opposite end portions tapering away from the meeting line of the pipes; a couple of collars inclosing the tapered end portions of such tubular structure and tapered correspondingly therewith, said soft-metal structure being extended to the opposite sides of the meeting line of the pipes to such an extent, and the inclination of the same and the collars being such, that a longitudinal movement of the collars will compress the soft-metal structure inwardly, and also longitudinally along the pipes in a direction toward the meeting line thereof, and said collars being sufficiently large and strong to enable them to alone withstand the strain incident to such compression, and being extended toward one another so that their flaring ends substantially meet, and the soft-metal structure substantially filling and being practically all confined within said collars; and bolts for drawing said collars together, each of said bolts being extended between and engaging flanges formed on said collars, whereby the adjustment of one set of bolts will tighten both collars.

Signed by us at Chicago, Illinois, this 10th day of October, 1899.

CHARLES E. FRINK.
MORRIS MURPHY.

Witnesses:
A. MILLER BELFIELD,
L. M. BULKLEY.